US008280605B2

(12) United States Patent
Yamaguchi (10) Patent No.: US 8,280,605 B2
(45) Date of Patent: Oct. 2, 2012

(54) BRAKING FORCE CONTROL APPARATUS FOR VEHICLE (75) Inventor: Kenichi Yamaguchi, Chiryu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 238 days.

(21) Appl. No.: 12/707,010

(22) Filed: Feb. 17, 2010

(65) Prior Publication Data

US 2010/0211274 A1 Aug. 19, 2010

(30) Foreign Application Priority Data

Feb. 19, 2009 (JP) ................................. 2009-036464

(51) Int. Cl.
B60B 39/00 (2006.01)
H02P 15/02 (2006.01)
(52) U.S. Cl. ............................................. 701/71; 477/9
(58) Field of Classification Search .................... 701/70, 701/71, 78, 83; 180/275, 370; 477/9, 15, 477/17, 31, 34, 37, 41, 69, 77, 79, 94, 101, 477/107, 109, 110, 111, 115, 156, 162; 303/20, 303/155
See application file for complete search history.

(56) References Cited

U.S. PATENT DOCUMENTS

| 6,292,719 B1* | 9/2001 | Seto et al. .......................... 701/1 |
| 2002/0094899 A1* | 7/2002 | Hamai ............................... 475/5 |
| 2003/0064858 A1* | 4/2003 | Saeki et al. .................... 477/166 |
| 2005/0197233 A1* | 9/2005 | Hoshiya et al. ................. 477/39 |
| 2006/0169036 A1* | 8/2006 | Eguchi et al. .................... 73/168 |
| 2010/0151987 A1* | 6/2010 | Notsu ............................... 477/3 |

FOREIGN PATENT DOCUMENTS

| JP | 11-165620 A | 6/1999 |
| JP | 2000-289593 A | 10/2000 |
| JP | 2000-344081 A | 12/2000 |
| JP | 2001-191904 A | 7/2001 |
| JP | 2003-335234 A | 11/2003 |
| JP | 2003-341494 A | 12/2003 |
| JP | 2004-108276 A | 4/2004 |
| JP | 2004-138105 A | 5/2004 |
| JP | 2004-138199 A | 5/2004 |
| JP | 2008-137587 A | 6/2008 |

OTHER PUBLICATIONS

Notification of Reasons for Refusal, drafting date Dec. 27, 2010 in Japanese Patent Application No. 2009-036464.
Chinese Office Action issued Jun. 5, 2012 for corresponding Application No. 201010116087.0.

* cited by examiner

Primary Examiner — James Trammell
Assistant Examiner — Muhammad Shafi
(74) Attorney, Agent, or Firm — Sughrue Mion, PLLC (57) ABSTRACT A braking force control apparatus for a vehicle is provided with a brake device that brakes a rotation of a drive wheel of a vehicle equipped with a continuously variable transmission and adjusts a magnitude of a braking force acting upon the drive wheel on the basis of a brake depression amount. The braking force control apparatus includes a controller that is configured to set an upper limit value of the braking force of the brake device when a restriction condition that is a condition, at which an excessively large torque input state occurs, has been estimated to be established, the excessively large torque input state being a state in which a reduced speed of the drive wheel based on the braking force is larger than an allowable limit speed.

20 Claims, 5 Drawing Sheets

BRAKING FORCE CONTROL APPARATUS FOR VEHICLE

INCORPORATION BY REFERENCE

The disclosure of Japanese Patent Application No. 2009-036464 filed on Feb. 19, 2009 including the specification, drawings and abstract is incorporated herein by reference in its entirety.

BACKGROUND OF THE INVENTION

1. Field of the Invention

The invention relates to a braking force control apparatus for a vehicle provided with a brake device that brakes the rotation of drive wheels of the vehicle equipped with a continuously variable transmission and adjusts the magnitude of a braking force acting upon the drive wheels on the basis of a brake depression amount.

2. Description of the Related Art

Continuously variable transmissions, which can perform shifting in a stepless manner, have recently been put to practical use with the object of reducing fuel consumption. The continuously variable transmissions are mainly of a belt type and a traction type, and a toroidal type is a typical traction type.

In a toroidal-type continuously variable transmission, two disks (at an input side and at an output side) are disposed parallel to each other and a plurality of power rollers are clamped between the disks by a strong force. When an inclination angle of power rollers changes, the ratio of rotation speeds of the two disks changes correspondingly, and the output revolution speed related to the input revolution speed is changed. In other words, the speed ratio is changed.

By contrast, in most belt-type continuously variable transmissions, shifting is performed with a metallic belt. A belt-type continuously variable transmission is typically constituted by an input pulley, an output pulley, and one metallic annular belt that is wound about the pulleys. A variable-width groove is provided on the outer circumference of the pulleys. The belt is wound within this groove located on the outer circumference.

The width of the groove in the pulleys is controlled hydraulically. As the width of the groove in the input pulley is increased, the belt is positioned closer to the center of the input pulley. In this case, the width of the groove of the output pulley decreases and the belt is positioned closer to the outer side of the output pulley. In other words, in this state, the belt has a small winding radius at the input pulley and a large winding radius at the output pulley. As a result, the revolution speed inputted from an input shaft to the input pulley is outputted upon reduction.

Where the width of the groove of the input pulley decreases, the width of the groove of the output pulley increases accordingly. In other words, the winding radius of the belt at the input pulley increases and the winding radius of the belt at the output pulley decreases. Thus, the inputted revolution speed is increased and the reduced torque is outputted.

In a state in which the belt is inserted into the grooves of the pulleys, the belt clamping force serving as a pressing force presses the belt against the pulleys. As a result, the belt and the pulleys move together due to the friction therebetween.

In such a belt-type continuously variable transmission, the belt can slip with respect to each pulley. Although the slip can be inhibited by increasing the belt clamping force, the increase in the belt clamping force also increases the power necessary to sustain the clamping pressure, increases power consumption, and causes wear of the device. Accordingly, in the conventional continuously variable transmission, the belt clamping force is adjusted on the basis of the operation state of the vehicle, thereby improving fuel consumption, while inhibiting the belt slip (see, for example, Japanese Patent Application Publication No. 2004-138199 (JP-A-2004-138199)).

However, in a certain vehicle travel mode, an excessively large inertia torque can be inputted from the drive wheels to the continuously variable transmission when a braking force based on a brake operation is generated. Such an event can produce, for example, the following results.

Let us assume that a vehicle travels on a road with a low friction such as observed on frozen roads and a driver performs an abrupt braking operation because the drive wheels have slipped. Because the reduction of speed in the drive wheels becomes very large due to the braking operation, an excessively large inertia torque is generated between the upstream side of the drive wheels and the downstream side of the continuously variable transmission. Furthermore, where a brake pedal is stepped upon when the drive wheels are separated from the ground as the vehicle travels and the drive wheels temporarily run idle, an excessively large inertia torque is generated following the abrupt speed reduction in the drive wheels.

A continuously variable transmission is constituted by members that are lower in strength than components of other devices installed on a vehicle, that is, mainly constituted by a metallic belt and pulleys. Therefore, when the aforementioned excessively large inertia torque is generated in a vehicle having a continuously variable transmission installed thereon and this torque is transmitted to the continuously variable transmission, the metallic belt can be damaged or fractured. Further, the above-described problems are explained in reference to the belt-type continuously variable transmission in which an excessively large inertia torque is transmitted to the continuously variable transmission from the drive wheels. However, in a traction-type continuously variable transmission, a problem associated with the deformation of curved surface of a disk can be considered. Therefore, the above-described problems can be said to be common to the continuously variable transmissions of both types.

SUMMARY OF THE INVENTION

The invention has been created with consideration for the above-described problems and provides a braking force control apparatus for a vehicle that can inhibit the transmission of an excessively large torque to a continuously variable transmission that is caused by a braking force based on a brake operation.

According to a first aspect of the invention, there is provided a braking force control apparatus for a vehicle provided with a brake device that brakes a rotation of a drive wheel of a vehicle equipped with a continuously variable transmission and adjusts a magnitude of a braking force acting upon the drive wheel on the basis of a brake depression amount, the apparatus including control means for setting an upper limit value of the braking force of the brake device when a restriction condition that is a condition, at which an excessively large torque input state occurs, has been estimated to be established, the excessively large torque input state being a state in which a reduced speed of the drive wheel based on the braking force is larger than an allowable limit speed.

With the braking force control apparatus of the above-described configuration, the upper limit value of the braking force is set when the restriction condition has been determined to be established, that is, when the excessively large torque input state has been estimated to occur. Therefore, it is stipulated that after the upper limit value has been set, the braking force applied from the brake device to the drive wheel assumes a magnitude exceeding the upper limit value. As a result, it is possible to inhibit the occurrence of an abrupt speed reduction in the drive wheel that follows the application of the braking force from the brake device to the drive wheel, more specifically it is possible to inhibit the transmission of an excessively large torque to the continuously variable transmission caused by the application of a braking force by the brake operation.

The reduction in speed of the drive wheel shows the increase in speed in the direction opposite that of the normal rotation thereof. Further, the allowable limit speed of speed reduction shows an upper limit speed reduction with respect to a speed reduction that is sufficiently less than that at which the belt of the continuously variable transmission can be damaged by the inertia torque inputted to the continuously variable transmission when the speed of the drive wheel is reduced by braking performed by the brake device. Thus, when the speed reduction of the drive wheel is greater than the allowable limit speed, there is a sufficiently high probability that a belt slip will occur because an inertia torque occurring due to this speed reduction is inputted to the continuously variable transmission.

In the braking force control apparatus for a vehicle, it is preferred that the brake device apply to the drive wheel a braking force of a magnitude corresponding to the depression amount, and when the restriction condition has been determined to be established, the controller set as the upper limit value a value that is less than the largest braking force applied to the drive wheel correspondingly to the depression amount.

In the braking force control apparatus for a vehicle, it is preferred that the controller estimate a magnitude of a braking force applied by the brake device to the drive wheel on the basis of the depression amount when the restriction condition has been determined to be established and make the braking force applied by the brake device to the drive wheel less than the upper limit value on the basis that the estimated braking force is larger than the upper limit value.

In the braking force control apparatus for a vehicle, it is preferred that the controller determine whether the restriction condition is established on the basis of a result obtained in determining as to whether a slip of the drive wheel has occurred.

The excessively large torque input state occurs following a brake operation based on a state in which a slip of a drive wheel occurs or following a contact with the pavement after the slip of a drive wheel has occurred. Therefore, with the braking force control apparatus of the above-described configuration, whether or not the excessively large torque input state has occurred can be accurately estimated by determining whether or not the restriction condition is established.

In the braking force control apparatus for a vehicle, it is preferred that the controller determine whether the restriction condition is established on the basis of a result obtained in determining whether a slip of the drive wheel has occurred and a determination result relating to a brake depression operation mode.

The excessively large torque input state occurs because a brake operation is performed on the basis of a state in which a slip of a drive wheel has occurred. Therefore, with the braking force control apparatus of the above-described configuration, whether or not the excessively large torque input state has occurred can be estimated more accurately by determining whether or not the restriction condition has been established.

In the braking force control apparatus for a vehicle, it is preferred that the control means determine that the restriction condition is established on the basis of determining that a slip of the drive wheel has occurred and determining that a brake depression amount is larger than a reference value.

In the braking force control apparatus for a vehicle, it is preferred that the control means determine that the restriction condition is established on the basis of determining that a slip of the drive wheel has occurred and determining that an increase rate of a depression amount of the brake is larger than a reference rate.

In the braking force control apparatus for a vehicle, it is preferred that the control means determine that a slip of the drive wheel has occurred on the basis that a rotation speed of the drive wheel is larger than a reference speed.

In the braking force control apparatus for a vehicle, it is preferred that when the restriction condition has been determined to be established, the vehicle include a belt-type continuously variable transmission as the continuously variable transmission, and the control means set the upper limit value on the basis of an allowable torque of a belt of the continuously variable transmission.

Even when an inertia torque is inputted from the drive wheel to a continuously variable transmission, no belt slip occurs if this torque is less than an allowable torque of the belt. Thus, the allowable torque can be said to indicate the magnitude of a limit that can be allowed as an input value of the torque from the drive wheel to the continuously variable transmission from the standpoint of inhibiting the damage of the belt or pulleys.

The inertia torque tends to increase with the increase in the speed reduction of the drive wheel, and the speed reduction of the drive wheel tends to increase with the increase in the braking force applied from the brake device to the drive wheel.

Therefore, in order to inhibit the damage of the belt caused by the input of the inertia torque, it is necessary to restrict the speed reduction of the drive wheel, that is, the magnitude of the braking force applied from the brake device to the drive wheel, so that the inputted torque becomes less than the allowable torque of the belt.

In the braking force control apparatus for a vehicle of the above-described configuration, with the aforementioned findings in view, the upper limit value of the braking force is set on the basis of the allowable torque of the belt at a time when the restriction condition has been determined to be established. Therefore, the inertia torque inputted to the continuously variable transmission is made less than the allowable torque and the damage of the belt and pulleys caused by the slip of the belt is accurately inhibited.

In the braking force control apparatus for a vehicle, it is preferred that the vehicle include a belt-type continuously variable transmission as the continuously variable transmission, and the control means compare a temporary upper limit value $XFL1$ as the upper limit value corresponding to the allowable torque of the belt of the continuously variable transmission and a temporary upper limit value $XFL2$ as the upper limit value corresponding to a tensile strength of the belt when the restriction condition has been determined to be established and eventually sets the smaller of the compared values as the upper limit value.

Thus, by setting the upper limit value of the braking force on the basis of the allowable torque of the belt, it is possible to inhibit the damage of the belt caused by the input of inertia torque. Further, in a case where the braking force is thus restricted, a load applied to the belt following the inertia torque in the state with same restrictions is usually lower than the tensile strength of the belt. Thus, where the inertia torque at the time the load applied to the belt is equal to the tensile strength is taken as a rupture torque, the allowable torque in most cases assumes a value less than that of the rupture torque.

Therefore, when the restriction condition is established, the rupture of the belt is accurately inhibited by making the inertia torque less than the allowable torque. However, because the rupture torque varies correspondingly to the operation state of the continuously variable transmission, in some cases, the allowable torque can assume a value larger than that of the rupture torque, in other words, the rupture torque can decrease to a value below that of the allowable torque. In this case, even if the braking force is restricted so that the inertia torque becomes less than the allowable torque, there still remains a possibility of the belt being ruptured because the inertia torque in such a restricted state exceeds the rupture torque.

In this regard, in order to prevent the occurrence of such an event, it is apparently possible to determine in advance the lowest value assumed as the rupture torque changes and conduct matching in advance with the allowable torque so that a value that is less than the determined value at all times is calculated as the allowable torque for setting the upper limit value. However, when such a method is employed, where the restriction condition is established, even if the rupture torque has a sufficiently high value and a comparatively large value is allowed to be set as the allowable torque, the allowable torque is actually set to a value that is less than the aforementioned lowest rupture torque. Further, because a restriction with respect to the breaking force is performed on the basis of this allowable torque, that is, because such a restriction of the braking force is performed despite the fact that the protection of the belt is ensured even without the preceding restriction, this restriction can hardly be called desirable from the standpoint of braking requirements of the driver.

In the braking force control apparatus for a vehicle of the above-described configuration, with the aforementioned findings in view, a temporary upper limit value XFL1 as the upper limit value corresponding to the allowable torque of the belt and a temporary upper limit value XFL2 as the upper limit value corresponding to the tensile strength (rupture torque) of the belt are compared each time and the smaller value thereof is eventually set as the upper limit value. As a result, the braking force can be restricted so that inertia torque inputted to the continuously variable transmission becomes less than both the allowable torque and the rupture torque, without using a mode of calculating a value that is less at all times than the lowest value of the rupture torque determined in advance as a mode of matching the allowable torque. Thus, it is possible both to inhibit accurately the damage of the belt and to inhibit the excessive restriction of the braking force.

In the braking force control apparatus for a vehicle, it is preferred that the control means calculate the allowable torque on the basis of a speed ratio of the continuously variable transmission.

In the braking force control apparatus for a vehicle, it is preferred that the control means calculate the allowable torque on the basis of a belt clamping pressure of the continuously variable transmission.

In the braking force control apparatus for a vehicle, it is preferred that the vehicle include a belt-type continuously variable transmission as the continuously variable transmission, and the control means increase a clamping pressure of a belt of the continuously variable transmission on the basis of that the restriction condition has been determined to be established.

In a case where an excessively large torque has been inputted from the drive wheel to the continuously variable transmission, when the belt clamping pressure is a comparatively small clamping pressure at which a slip induced by this torque is not supposed to occur, the damage of the belt and the deformation of the pulleys that accompany the belt slip can cause concern. With the braking force control apparatus of the above-described configuration, with the aforementioned findings in view, the belt clamping force on the basis of that the restriction condition has been established. Therefore, the occurrence of belt slip caused by the input of torque from the drive wheel to the continuously variable transmission can be inhibited more accurately.

In the braking force control apparatus for a vehicle, it is preferred that when the restriction conditions has been determined to be established, the control means set the upper limit value before the brake device applies to the drive wheel a braking force of a magnitude corresponding to the depression amount.

In the braking force control apparatus for a vehicle, it is preferred that when the restriction condition has been determined to be established, the control means set the upper limit value for a braking force of the brake device based only on the determination result.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
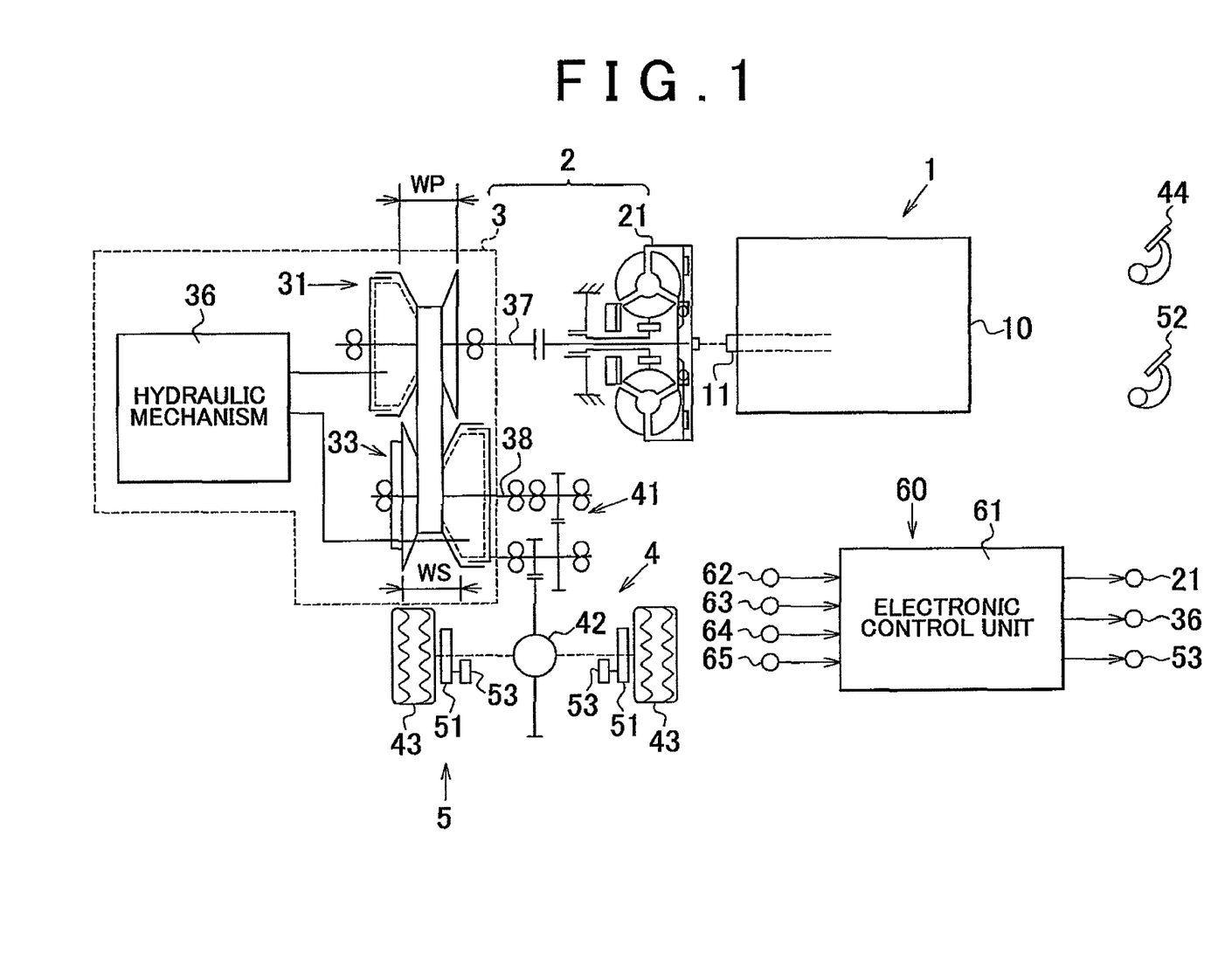
FIG. 1 is a schematic view illustrating the configuration of a vehicle having installed therein a braking force control device for a vehicle in one specific embodiment thereof.

A specific embodiment of the invention will be explained below as a braking force control apparatus of a vehicle having a belt-type continuously variable transmission with reference to FIGS. 1 to 5. As shown in FIG. 1, the vehicle is provided with an internal combustion engine 1 that generates power for moving the vehicle, an automatic transmission 2 that transmits the rotation of a crankshaft 11 of the internal combustion engine 1, a drive apparatus 4 that transmits a torque outputted from the automatic transmission 2 to the drive wheels 43, and a brake device 5 that applies a braking force to the drive wheels 43. There are also provided an accelerator pedal 44 and a foot brake 52 onto which the driver can step to brake the vehicle. Various devices installed on the vehicle, including the aforementioned devices, are together controlled by a control unit 60.

The automatic transmission 2 is provided with a torque converter 21 that outputs the rotation inputted from the crankshaft 11 of an engine body 10 to a continuously variable transmission 3 and the continuously variable transmission 3 that changes the rotation transmitted from the torque converter 21 in a stepless manner.

The torque inputted from the internal combustion engine 1 to the automatic transmission 2 is amplified by the torque converter 21, shifting is performed according to a predetermined speed ratio γ that is set by the continuously variable transmission 3, and then the torque is finally outputted by a drive device 4 to the drive wheels 43.

The continuously variable transmission 3 is provided with an input shaft 37 connected to the torque converter 21, an input pulley 31 that rotates together with the input shaft 37, an output pulley 33 that rotates in response to the rotation of the input pulley 31, and an output shaft 38 that rotates together with the output pulley 33.

Respective variable-width grooves are provided on the circumference of the input pulley 31 and output pulley 33. An annular metallic belt 35 is wound about the pulleys in the groove. The belt 35 is clamped in the widthwise direction by the input pulley 31 and the output pulley 33. Thus, in the input pulley 31 and the output pulley 33, the belt 35 is pressed against the wall surfaces of the grooves of the corresponding pulleys by a predetermined pressure (referred to hereinbelow as "belt clamping pressure PV").

As a result, friction is produced between the input pulley 31 and output pulley 33 and the belt 35 and tension is generated in the belt 35. Therefore, the input pulley 31 and the output pulley 33 are linked via the belt 35.

More specifically, the transmission of rotation via the belt 35 is conducted in the following matter. When the input shaft 37 and input pulley 31 are rotated by the input from the torque converter 21, the belt 35 is wound about the groove of the input pulley 31 and pressed against the input pulley 31, whereby the belt 35 is caused to rotate together with the input pulley 31. The belt 35 is also wound about the output pulley 33 and pressed against the output pulley 33. Therefore, the output pulley 33 also rotates following the rotation of the input pulley 31. The rotation of the output pulley 33 and the output shaft 38 is transmitted via a reduction gear 41 and a differential gear 42 of the drive device 4 to the drive wheels 43.

The width of the groove of the input pulley 31 (referred to hereinbelow as "input groove width WP") and the width of the groove of the output pulley 33 (referred to hereinbelow as "output groove width WS") are controlled by a hydraulic mechanism 36. When the input groove width WP is changed by the hydraulic mechanism 36, the winding diameter of the belt 35 in the input pulley 31 (referred to hereinbelow as "input diameter RP") is changed accordingly. Further, when the output groove width WS is changed by the hydraulic mechanism 36, the winding diameter of the belt 35 in the output pulley 33 (referred to hereinbelow as "output diameter RS") is changed accordingly. By changing the input diameter RP and output diameter RS, it is possible to change the speed ratio y, which is the ratio of the revolution speed of the output shaft 38 (referred to hereinbelow as "output revolution speed NR") to the revolution speed of the input shaft 37 (referred to hereinbelow as "input revolution speed NP").

The brake device 5 is provided with a brake unit 51 that applies a force braking the rotation of the drive wheels 43 (will be referred to hereinbelow as "braking force BF") on the basis of the amount of depression operation of the foot brake 52 performed by the driver (referred to hereinbelow as "depression amount BP") to the drive wheels 43. The brake unit 51 applies a braking force to the drive wheels 43 via a damper device 53. The damper device 53 is a control device for the braking force BF that is provided with a hydraulic chamber and has a hydraulic pressure in the hydraulic chamber controlled by an electronic control unit 61. When a hydraulic pressure based on the depression amount BP is generated in the damper device 53 by the depression of the foot brake 52, the brake unit 51 is driven on the basis of this hydraulic pressure. In this case, the electronic control unit 61 can control the hydraulic pressure inside the hydraulic chamber, that is, can control the braking force BF to a value that is not unique and based on the depression amount BP by causing the oil to flow into the hydraulic chamber or therefrom. The brake device 5 is constituted by the brake unit 51, foot brake 52, and damper device 53.

The control unit 60 is provided with various sensors that monitor the operation state of the vehicle and the like, that is, an accelerator position sensor 62, a food brake sensor 63, a belt clamping pressure sensor 64, and a vehicle speed sensor 65 and the electronic control unit 61 that controls the operation of various devices of the vehicle on the basis of outputs of the sensors.

The accelerator position sensor 62 is provided in the vicinity of the accelerator pedal 44 and outputs a signal corresponding to the amount of depression operation (referred to hereinbelow as "depression amount AP") of the accelerator pedal 44 performed by the driver. The foot brake sensor 63 outputs a signal corresponding to the depression amount BP of the foot brake 52. The belt clamping pressure sensor 64 is provided in the vicinity of the output pulley 33 and outputs a signal corresponding to the belt clamping pressure VP. The vehicle speed sensor 65 is provided in the vicinity of the drive wheels 43 and outputs a signal corresponding to the rotation speed of the drive wheels 43 (referred to hereinbelow as "vehicle speed VW").

Figure 2A:
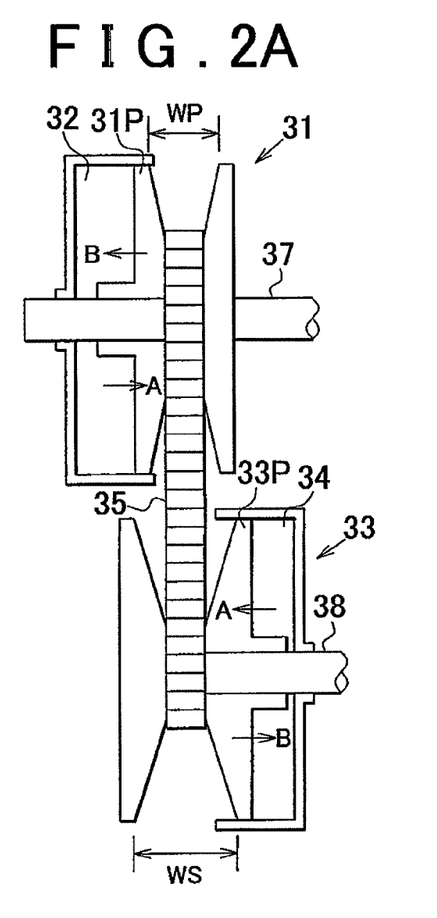
FIG. 2A is a cross-sectional view illustrating the cross-sectional structure of a continuously variable transmission of the same embodiment.

The electronic control unit 61 conducts various control operations, for example, controls the automatic transmission 2 and brake device 5, on the basis of the operation state determined on the basis of outputs of various sensors inclusive of the above-described sensors. As shown in FIG. 2A, a hydraulic chamber 32 is provided inside the input pulley 31. The hydraulic pressure of the hydraulic chamber 32 is controlled by the hydraulic mechanism 36 (see FIG. 1). The input groove width WP and belt clamping pressure VP of the input pulley 31 are adjusted in the following manner by the control of the hydraulic pressure performed by the hydraulic mechanism 36.

When the hydraulic pressure in the hydraulic chamber 32 is increased by the control of the hydraulic mechanism 36, a piston wall 31P moves in a direction A of applying pressure to the belt 35 and the input groove width WP decreases. In this case, the belt clamping pressure VP, which is the force that presses the belt 35 against the groove wall surface, increases. Conversely, when the hydraulic pressure of the hydraulic chamber 32 is decreased by the control of the hydraulic mechanism 36, the piston wall 31P moves in a direction B of withdrawing from the belt 35 and the input groove width WP increases. In this case, the belt clamping pressure VP, which is the force that presses the belt 35 against the groove wall surface, decreases.

The output pulley 33 is provided with a hydraulic chamber 34 and a piston wall 33P that are similar to the hydraulic chamber 32 and piston wall 31P of the input pulley 31. When the output groove width WS is decreased by the hydraulic mechanism 36, the belt clamping pressure VP of the output pulley 33 increases, and when the output groove width WS increases, the belt clamping pressure VP decreases. The input groove width WP and output groove width WS are changed cooperatively so as to maintain a state in which the belt 35 is wound about the pulleys, without causing the deflection of the belt 35.

Figure 2B:
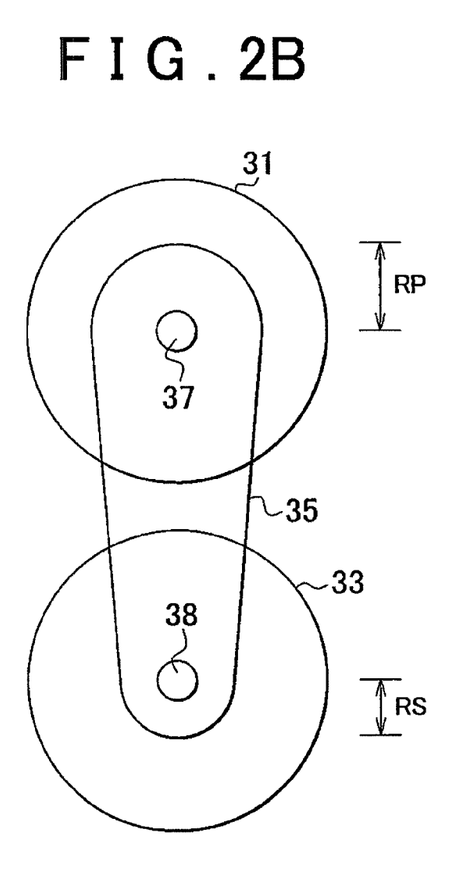
FIG. 2B is a schematic view illustrating a belt winding mode for each pulley shown in FIG. 2A in the continuously variable transmission of the same embodiment.

As shown in FIGS. 2A and 2B, in the continuously variable transmission 3, the input diameter RP of the input pulley 31 and the output diameter RS of the output pulley 33 change correspondingly to the input groove width WP and output groove width WS, respectively. Thus, when the input groove width WP decreases and the output groove width WS increases, the input diameter RP increases and the output diameter RS decreases following these variations, and the speed ratio γ decreases. The speed ratio γ can be represented as "γ=RS/RP" via the input diameter RP and the output diameter RS.

The clamping pressure control of the belt 35 for performing torque transmission in the continuously variable transmission 3, that is, the hydraulic control, is conducted by controlling the hydraulic pressure in the hydraulic chamber 34 in the output pulley 33. From the standpoint of reducing the wear of the belt 35 and improving fuel consumption, a smaller clamping pressure VP is preferred. However, where the belt clamping force VP is small, a force that holds the belt 35 at the ideal winding diameter is weakened and friction generated between the belt 35 and the pulleys is also reduced. Therefore, the belt slip can easily occur. Therefore, the hydraulic pressure in the output pulley 33 is controlled so as to obtain an optimum belt clamping pressure VP that can be calculated from the standpoint of torque transmission and belt slip inhibition.

A mode of restricting the braking force BF with an upper limit value BFL will be explained below with reference to FIG. 3. Under certain vehicle travel conditions, an excessively large inertia torque can be inputted from the drive wheels 43 to the continuously variable transmission 3 when the braking force BF based on the brake device 5 is generated. For example, let us assume that a vehicle travels on a road with a low friction such as observed on frozen roads and a driver performs an abrupt depression operation of the brake 52 because the drive wheels 43 have slipped. In this case, because the reduction in speed of the drive wheels 43 becomes very large due to the braking operation, an excessively large inertia torque is generated between the upstream side of the drive wheels 43 and the downstream side of the continuously variable transmission 3. Furthermore, where a state occurs in which the drive wheels 43 are separated from the ground as the vehicle travels and the drive wheels 43 temporarily run idle, and the brake 52 is abruptly stepped upon before the wheels come into contact with the ground, an excessively large inertia torque is also generated following the abrupt speed reduction in the drive wheels 43.

The continuously variable transmission 3 is configured to include members that are lower in strength than the components of other devices installed at the vehicle, that is, to include the belt 35 in a belt-type continuously variable transmission and disks in a toroidal-type continuously variable transmission. Therefore, when the aforementioned excessively large inertia torque is transmitted to the continuously variable transmission 3, the belt 35 can be damaged or curved surface of the disks can be deformed.

Accordingly, in the embodiment, an excessively large torque is prevented from acting upon the belt 35 or disks. Thus, a state in which a torque that is equal to or greater than an allowed amount is inputted from the drive wheels 43 to the continuously variable transmission 3 as the drive wheels 43 are braked based on the braking force BF is taken as an excessively large torque input state, and it is monitored whether a restriction condition that is a condition, at which an excessively large torque input state occurs, is established. When it is determined that the restriction condition is established, an upper limit value BFL is set for the braking force BF of the brake device 5 on the basis of this determination, and as long as it is determined that the restriction condition is established, the brake device 5 is controlled (this control is referred to hereinbelow as "excessively large torque input inhibition processing") so that the braking force BF larger than the upper limit value BFL is not applied to the drive wheels 43.

As a result, it is possible to inhibit the occurrence of abrupt speed reduction in the drive wheels 43 as the braking force BF is applied from the brake device 5 to the drive wheels 43, that is, the transmission of an excessively large torque to the continuously variable transmission 3 that is caused by the braking force BF based on the brake operation.

The allowed amount relating to the inertia torque corresponds to a limit value of the inertia torque at which the belt 35 is not damaged and this amount can be determined in advance by tests or the like. When the inertia torque of the continuously variable transmission 3 is less than the allowed amount, the damage of the belt 35 or the like can be avoided. A state in which the restriction condition has been determined to be established indicates a period in which the excessively large torque input state has already occurred and also a period before the excessively large torque input state has occurred.

Figure 3:
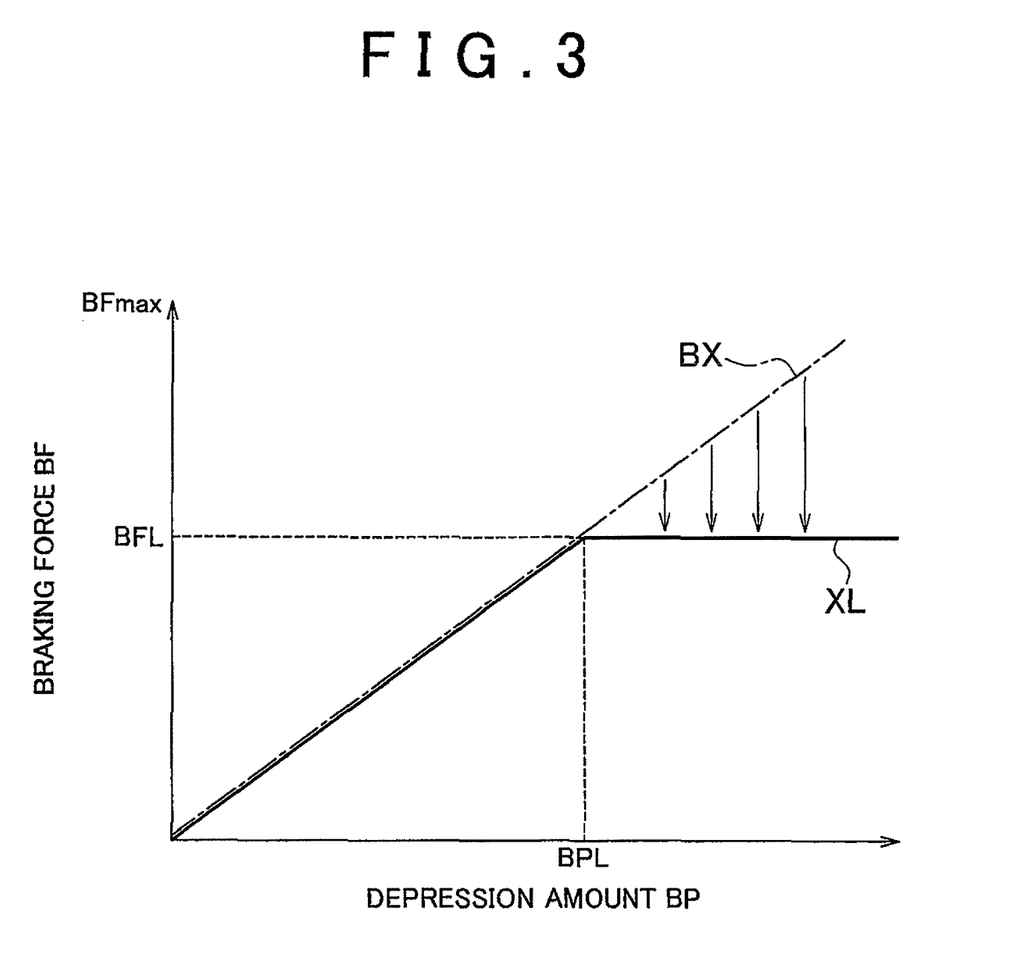
FIG. 3 is a flowchart illustrating the processing sequence of the "excessively large torque input inhibition processing" executed by an electronic control unit in the same embodiment.

As shown in FIG. 3, when the vehicle is in a normal travel state, the brake device 5 applies a large braking force BF corresponding to the depression amount BP to the drive wheels 43. Thus, as shown by a line BX (dash-dot line), the braking force BF applied to the drive wheels 43 increases linearly with the increase in the brake depression amount BP. However, when the vehicle is in the excessively large torque input state, with the application of the braking force BF that is larger than the upper limit value BFL to the drive wheels 43 being restricted, after an amount at which the brake depression amount BP corresponds to the upper limit value BFL is exceeded (this amount is referred to hereinbelow as "boundary depression amount BPL"), the braking force BF corresponding to the upper limit value BFL is applied to the drive wheels 43, regardless of the brake depression amount BR Thus, as shown by a line XL (solid line), in a region in which the brake depression amount BP is less than the boundary depression amount BPL, the braking force BF increases linearly with the increase in the brake depression amount BP, but in a region in which the brake depression amount BP is larger than the boundary depression amount BPL, the braking force is maintained at a constant magnitude corresponding to the upper limit value BFL.

The excessively large input inhibition processing involves the following types of processing.

(A) Whether the restriction condition is established is determined on the basis of results obtained in determining whether a slip of the drive wheels 43 has occurred and results obtained in determining the operation mode of the brake 52.

(B) When the restriction condition has been determined in (A) to be established, the brake device 5 sets a value that is less than the maximum braking force BFmax that is applied to the drive wheels 43 correspondingly to the depression amount BP as the upper limit value BFL.

(C) When the upper limit value BFL has been set in (B), the vehicle is assumed to be in the normal travel state and the braking force BF applied by the brake device 5 to the drive wheels 43 is calculated based on the depression amount BP. When this estimated braking force BF is larger than the upper limit value BFL, the braking force BF applied by the brake device 5 to the drive wheels 43 is restricted to a value below the upper limit value BFL. Such a restriction of the braking force BF with the upper limit value BFL is executed based only on that the restriction condition has been determined to be established.

(D) When the braking force BF is restricted by the upper limit value BFL in (C), it is possible to set the upper limit value BFL before the brake device 5 applies the braking force BF to the drive wheels 43 and restrict the braking force BF with this upper limit value BFL. Thus, the period in which the braking force BF is applied from the brake device 5 to the drive wheels 43 is extended and the application of the braking force BF is allowed after the state in which the restriction of the braking force BF by the upper limit value BFL is possible has been assumed.

In the continuously variable transmission 3 of the embodiment, when the restriction condition is established, a "belt slip response processing" designed to inhibit the slip of the belt 35 that follows the slip of the drive wheels 43 can be also executed, separately from the above-described "excessively large torque input inhibition processing".

In a case where an excessively large torque has been inputted from the drive wheels to the continuously variable transmission, when the belt clamping pressure is a comparatively small clamping pressure at which a slip induced by this torque is not supposed to occur, the damage of the belt and the deformation of the pulleys that accompany the belt slip can cause concern.

Accordingly, in the embodiment, with the aforementioned findings in view, a "belt slip response processing" that increases the belt clamping force before the restriction conditions is established, that is, the processing that increases the belt clamping force to the restriction belt clamping force VPX, is executed on the basis of restriction condition fulfillment. Thus, by increasing the belt clamping force by the "belt slip response processing" in combination with restricting the braking force BF by the "excessively large torque input restriction processing", it is possible to inhibit more accurately the occurrence of the belt slip caused by the input of torque from the drive wheels to the continuously variable transmission. As for the mode of increasing the belt clamping force, in addition to increasing the belt clamping force to the preset restriction belt clamping force VPX, it is also possible to calculate the restriction belt clamping force VPX corresponding to the values of the inertia torque that is supposed to occur from time to time before the restriction condition is established and then increase the belt clamping force to the calculated restriction belt clamping force VPX.

A mode of setting the upper limit value BFL will be explained below in greater detail. Even when an inertia torque is inputted from the drive wheels 43 to the continuously variable transmission 3, no slip of the belt 35 occurs if the torque is less than an allowable torque of the belt 35. Thus, the allowable torque can be said to indicate the value of a limit that can be allowed as an input value of the torque from the drive wheels 43 to the continuously variable transmission 3 from the standpoint of inhibiting the damage of the belt 35 (disks in the toroidal-type continuously variable transmission).

The inertia torque tends to increase with the increase in the speed reduction of the drive wheels 43, and the speed reduction of the drive wheels 43 tends to increase with the increase in the braking force BF applied from the brake device 5 to the drive wheels 43.

Therefore, it can be said that in order to inhibit the damage of the belt 35 caused by the input of the inertia torque, it is necessary to restrict the speed reduction of the drive wheels 43, that is, the value of the braking force BF applied from the brake device 5 to the drive wheels 43, so that the inputted torque becomes less than the allowable torque of the belt 35.

Accordingly, in the embodiment, with the aforementioned findings in view, the inertia torque inputted to the continuously variable transmission 3 is made less than the allowable torque and the damage of the belt 35 caused by the slip of the belt 35 is accurately inhibited by setting the upper limit value BFL of the braking force BF on the basis of the allowable torque of the belt 35.

Meanwhile, as mentioned hereinabove, by setting the upper limit value BFL of the braking force BF on the basis of the allowable torque of the belt 35, it is possible to inhibit the damage of the belt 35 caused by the input of inertia torque. Further, in a case where the braking force BF is thus restricted, a load applied to the belt 35 following the inertia torque in the state with same restrictions is usually lower than the tensile strength of the belt 35. Thus, where the inertia torque at the time the load applied to the belt 35 is equal to the tensile strength is taken as a rupture torque, the allowable torque in most cases assumes a value less than that of the rupture torque.

Therefore, when the restriction condition is established, the rupture of the belt 35 is accurately inhibited by making the inertia torque less than the allowable torque. However, because the rupture torque varies correspondingly to the operation state of the continuously variable transmission 3, in some cases, the allowable torque can assume a value larger than that of the rupture torque, in other words, the rupture torque can decrease to a value below that of the allowable torque. In this case, even if the braking force BF is restricted so that the inertia torque becomes less than the allowable torque, there still remains a possibility of the belt 35 being ruptured because the inertia torque in such a restricted state exceeds the rupture torque.

In this regard, in order to prevent the occurrence of such an event, it is apparently possible to determine in advance the lowest value assumed as the rupture torque changes and conduct matching in advance with the allowable torque so that a value that is less than the determined value at all times is calculated as the allowable torque for setting the upper limit value BFL. However, when such a method is employed, where the restriction condition is established, even if the rupture torque has a sufficiently high value and a comparatively large value is allowed to be set as the allowable torque, the allowable torque is actually set to a value that is less than the aforementioned lowest rupture torque. Further, because a restriction with respect to the braking force BF is performed on the basis of this allowable torque, that is, because such a restriction of the braking force BF is performed despite the fact that the protection of the belt 35 is ensured even without the preceding restriction, this restriction can hardly be called desirable from the standpoint of braking requirements of the driver.

Accordingly, in the embodiment, with the aforementioned findings in view, the following feature is used in addition to the above-described feature of setting the upper limit value of the braking force on the basis of the allowable torque of the belt. Thus, a temporary upper limit value XFL1 as the upper limit value corresponding to the allowable torque of the belt and a temporary upper limit value XFL2 as the upper limit value corresponding to the tensile strength (rupture torque) of the belt are compared each time and the smaller value of the compared values is eventually set as the upper limit value. As a result, the braking force BF can be restricted so that the inertia torque inputted to the continuously variable transmission 3 becomes less than both the allowable torque and the rupture torque, without using a mode of calculating a value that is less at all times than the lowest value of the rupture torque determined in advance as a mode of matching the allowable torque. Thus, it is possible both to inhibit accurately the damage of the belt and to inhibit the excessive restriction of the braking force 13F.

Figure 4:
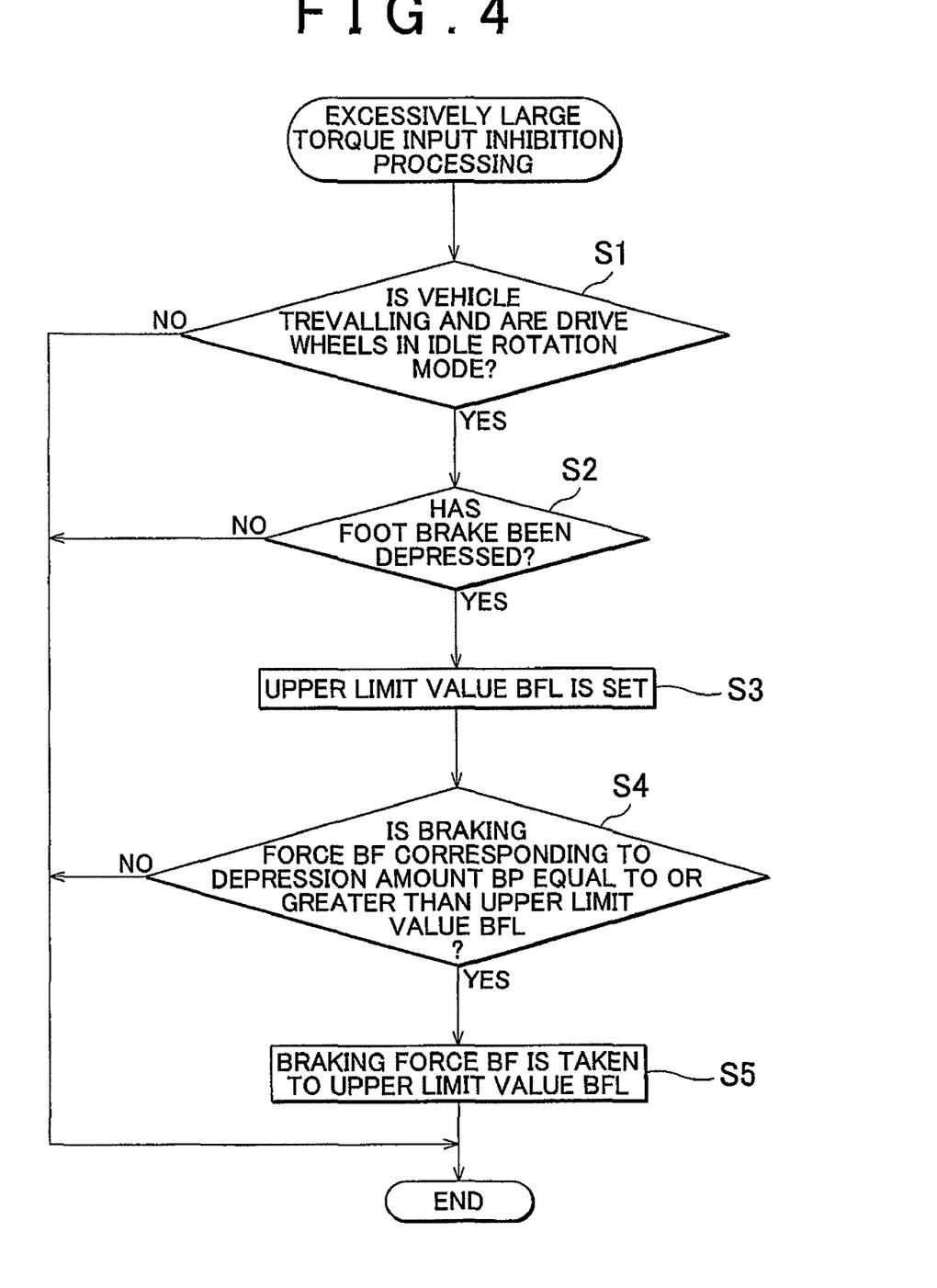
FIG. 4 is a map showing the relationship between an allowable torque and a speed ratio γ that is used in the "excessively large torque input inhibition processing" in the same embodiment.

A specific processing sequence of the "excessively large torque input inhibition processing" will be explained below with reference to FIG. 4. In step S1, it is determined whether the vehicle is traveling and a slip of the drive wheels 43 has occurred. This determination can be made by detecting the wheel speed VW with the wheel speed sensor 65. Thus, it is determined whether the revolution speed of the drive wheels 43 has a value such that exceeds a predetermined value that does not occur in the usual driving mode. Where idle rotation of the drive wheels 43 is determined, the processing flow advances to the next step S2. Where no idle rotation of the drive wheels 43 is detected, the processing is ended temporarily.

Then, in step S2, it is determined whether the foot brake 52 has been stepped on. When a phenomenon such as a slip of the drive wheels 43 has occurred, the driver sometimes strongly steps on the foot brake 52. When the foot brake 52 is stepped on, an input torque caused by the brake force BF, that is, an excessively large inertia torque, can be generated with respect to the continuously variable transmission 3. Therefore, in a case where it has been determined that the brake 52 is stepped on, the restriction condition of the upper limit value BFL is assumed to be established for the braking force BF and the processing advances to step S3. When it is determined that the brake has not been stepped on, the processing is ended.

When idle rotation of the drive wheels 43 has occurred and the brake has been stepped on, the upper limit value BFL of the braking force BF is calculated in step S3. Then, in step S4, it is determined whether the braking force BF corresponding to the depression amount BP of the foot brake 52 exceeds the upper limit value BFL calculated in step S3. Where it is determined that the braking force BF exceeds the upper limit value BFL, the processing flow advances to step S5 where the braking force BF has to be restricted. When the braking force BF is determined not to exceed the upper limit value BFL, the processing is ended.

Thus, in these steps S1 to S4, it is determined that the restriction condition of the braking force BF has been established on the basis of determining that a slip of the drive wheels 43 has occurred and also determining that the depression amount BP of the foot brake 52 is larger than the reference amount.

When it is determined that the restriction condition has been established, in step S5, the electronic control unit 61 conducts a control that prevents the occurrence of a braking force BF that is equal to or greater than the upper limit value BFL via the damper device 53 connected to the brake unit 51.

A specific mode of calculating the upper limit value BFL in step S3 of the above-described "excessively large torque input inhibition processing" will be explained below. The easiness of occurrence of the slip of the belt 35 changes under the effect of the speed ratio $\gamma$ of the continuously variable transmission 3 and the belt clamping pressure VP. Therefore, the allowable torque can be calculated as a function of the speed ratio $\gamma$ of the continuously variable transmission 3 and the belt clamping pressure VP. Thus, the calculated allowable torque decreases with the increase in the speed ratio $\gamma$. Further, the calculated allowable torque decreases with the increase in the belt clamping pressure VP.

In the continuously variable transmission 3 of the embodiment, when the restriction condition is established as described hereinabove, the "belt slip response processing" is performed, that is, the belt clamping pressure is fixed to the belt clamping force VPX, hence the allowable torque is calculated as a function of the speed ratio $\gamma$.

Figure 5:
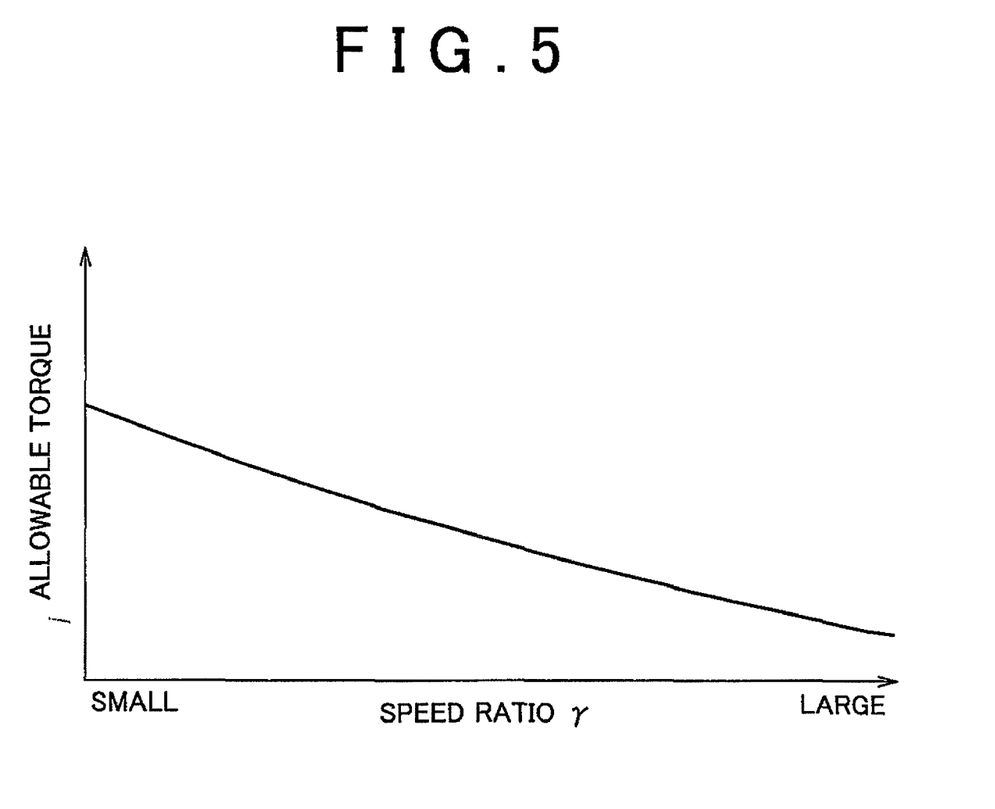
FIG. 5 is a graph showing the relationship between a brake depression amount and a braking force at the time the upper limit value of the braking force is set by the "excessively large torque input inhibition processing" in the same embodiment.

Therefore, in step S3, the allowable torque corresponding to the appropriate speed ratio $\gamma$ is calculated on the basis of the relationship between the speed ratio $\gamma$ and the allowable torque adapted with the proviso that the belt clamping pressure VP has been set to the restriction clamping pressure VPX, that is, on the basis of the map shown in FIG. 5, an allowable torque is calculated in accordance with a speed ratio $\gamma$ at a specific time and the temporary upper limit value XFL1 is calculated on the basis of this allowable torque.

The calculated temporary upper limit value XFL1 is compared with a temporary upper limit value XFL2 that has been matched in advance with a tensile strength of the belt 35 for which the belt clamping force VP is the restriction belt clamping force VPX, and the smaller of the two values is eventually calculated as the upper limit value BFL. In a case where the belt clamping force VP at the time the restriction condition is established changes each time, the tensile strength corresponding to the appropriate belt clamping force VP is calculated by the map into which the relationship between the belt clamping force VP and tensile strength has been fitted in advance, and the temporary upper limit value XFL2 is calculated on the basis of the calculated tensile strength.

In the continuously variable transmission 3, where a comparatively large restriction clamping pressure VPX selected with the object of inhibiting the slip of the belt 35 is set as the belt clamping pressure VP when the restriction condition is established, the tensile strength (rupture torque) at the time the restriction condition is established assumes a value less than that in a case where the restriction clamping pressure VPX is not set. In other words, this means that the probability of the rupture torque being lower than the allowable torque at this time increases, that is, the probability of the upper limit value based on the tensile strength being lower than the upper limit value based on the allowable torque increases.

In the "excessively large torque input inhibition processing", the relationship in size between the temporary upper limit value XFL1 based on the allowable torque and the temporary upper limit value XFL2 based on the tensile strength (rupture torque) is confirmed each time. Therefore, even if the rupture torque becomes lower than the allowable torque as the belt clamping force is fixed to the restriction clamping pressure VPX, the belt rupture can be accurately inhibited.

As described hereinabove, with the braking force control apparatus for a vehicle of the embodiment, the following effect can be obtained. (1) The vehicle of the embodiment is provided with the brake device 5 that brakes a rotation of the drive wheels 43 of a vehicle equipped with the continuously variable transmission 3 and adjusts a value of the braking force BF acting upon the drive wheels 43 on the basis of the depression amount BP of the foot brake 52. Further provided is the controller that is configured to set the upper limit value BFL of the braking force BF of the brake device 5 when a restriction condition that is a condition at which an excessively large torque input state occurs has been estimated to be established, the excessively large torque input state being a state in which a reduced speed of the drive wheels 43 based on the braking force BF is larger than an allowable limit speed.

Because the upper limit value BFL of the braking force BF is set when the restriction condition has been determined to be established, that is, when the excessively large torque input state is estimated to occur, it is stipulated that after the upper limit value BFL has been set, the braking force BF applied from the brake device 5 to the drive wheels 43 assumes a value exceeding the upper limit value BFL. As a result, it is possible to inhibit the occurrence of an abrupt speed reduction in the drive wheels 43 that follows the application of the braking force BF from the brake device 5 to the drive wheels 43 and also to inhibit the transmission of an excessively large torque to the continuously variable transmission 3 caused by the application of a braking force BF by the operation of the brake 52.

The reduction in speed of the drive wheels 43 shows the increase in speed in the direction opposite that of the normal rotation thereof. Further, the allowable limit speed of speed reduction shows an upper limit speed reduction with respect to a speed reduction that is sufficiently less than that at which the belt 35 of the continuously variable transmission 3 can be damaged by the inertia torque inputted to the continuously variable transmission 3 when the speed of the drive wheels 43 is reduced by braking performed by the brake device 5. Thus, when the speed reduction of the drive wheels 43 is greater than the allowable limit speed, there is a sufficiently high probability that a slip of the belt 35 will occur because an inertia torque occurring due to this speed reduction is inputted to the continuously variable transmission 3.

(2) In the embodiment, the brake device 5 applies a braking force BF of a magnitude corresponding to the depression amount BP to the drive wheels 43. Further, when the restriction condition has been determined to be established, the upper limit value BFL is set a value that is less than the largest braking force BF applied to the drive wheels 43 correspondingly to the depression amount. Further, when the restriction condition has been determined to be established, a value of a braking force BF applied by the brake device 5 to the drive wheels 43 is estimated on the basis of the depression amount BP. Further, the braking force BF applied by the brake device 5 to the drive wheels 43 is made less than the upper limit value BFL on the basis of that the estimated braking force BF is larger than the upper limit value BFL. In addition, whether the restriction condition if established is determined on the basis of a result obtained in determining as to whether a slip of the drive wheels 43 has occurred.

The excessively large torque input state occurs following a brake operation based on a state in which a slip of the drive wheels 43 occurs. Therefore, whether or not the excessively large torque input state has occurred can be accurately estimated by determining whether or not the restriction condition is established according to the mode of the embodiment.

(3) In the embodiment, whether the restriction condition is established is determined on the basis of a result obtained in determining whether a slip of the drive wheels 43 has occurred and a determination result relating to a depression operation mode of the brake 52.

The excessively large torque input state occurs because a brake operation is performed on the basis of a state in which a slip of the drive wheels 43 has occurred. Whether or not the excessively large torque input state has occurred can be estimated more accurately by determining whether or not the restriction condition has been established according to the mode of the embodiment.

(4) In the embodiment, the vehicles includes a belt-type continuously variable transmission as the continuously variable transmission 3. Further, the restriction condition is determined to be established on the basis of determining that a slip of the drive wheels 43 has occurred and determining that the depression amount BP of the brake 52 is larger than a reference value. Further, the restriction condition can be determined to be established on the basis of determining that a slip of the drive wheels 43 has occurred and determining that an increase rate of the depression amount BP of the brake 52 is larger than a reference rate. It is determined that a slip of the drive wheels 43 has occurred on the basis of that a rotation speed of the drive wheels 43 is larger than a reference speed. When the restriction condition has been determined to be established, the upper limit value BFL is set on the basis of an allowable torque of the belt 35 of the continuously variable transmission 3.

Even when an inertia torque is inputted from the drive wheels 43 to a continuously variable transmission 3, no slip of the belt 35 occurs if this torque is less than an allowable torque of the belt 35. Thus, the allowable torque can be said to indicate the value of a limit that can be allowed as an input value of the torque from the drive wheels 43 to the continuously variable transmission 3 from the standpoint of inhibiting the damage of the belt 35 or disks.

The inertia torque tends to increase with the increase in the speed reduction of the drive wheels 43, and the speed reduction of the drive wheels 43 tends to increase with the increase in the braking force BF applied from the brake device 5 to the drive wheels 43.

Therefore, in order to inhibit the damage of the belt 35 caused by the input of the inertia torque, it is necessary to restrict the speed reduction of the drive wheels 43, that is, the value of the braking force BF applied from the brake device 5 to the drive wheels 43, so that the inputted torque becomes less than the allowable torque of the belt 35.

In according with the invention, with the aforementioned findings in view, the upper limit value BFL of the braking force BF is set on the basis of the allowable torque of the belt 35 at a time when the restriction condition has been determined to be established. Therefore, the inertia torque inputted to the continuously variable transmission 3 is made less than the allowable torque and the damage of the belt or disks caused by the slip of the belt can be accurately inhibited.

(5) In the embodiment, when the restriction condition has been determined to be established, a temporary upper limit value XFL1 as the upper limit value corresponding to the allowable torque of the belt of the continuously variable transmission and a temporary upper limit value XFL2 as the upper limit value corresponding to a tensile strength of the belt are compared and the smaller of the compared values is eventually set as the upper limit value BFL.

As described hereinabove, by setting the upper limit value BFL of the braking force BF on the basis of the allowable torque of the belt 35, it is possible to inhibit the damage of the belt 35 caused by the input of inertia torque. Further, in a case where the braking force BF is thus restricted, a load applied to the belt 35 following the inertia torque in the state with same restrictions is usually lower than the tensile strength of the belt 35. Thus, where the inertia torque at the time the load applied to the belt 35 is equal to the tensile strength is taken as a rupture torque, the allowable torque in most cases assumes a value less than that of the rupture torque.

Therefore, when the restriction condition is established, the rupture of the belt 35 is accurately inhibited by making the inertia torque less than the allowable torque. However, because the rupture torque varies correspondingly to the operation state of the continuously variable transmission 3, in some cases, the allowable torque can assume a value larger than that of the rupture torque, in other words, the rupture torque can decrease to a value below that of the allowable torque. In this case, even if the braking force BF is restricted so that the inertia torque becomes less than the allowable torque, there still remains a possibility of the belt 35 being ruptured because the inertia torque in such a restricted state exceeds the rupture torque.

In this regard, in order to prevent the occurrence of such an event, it is apparently possible to determine in advance the lowest value assumed as the rupture torque changes and conduct matching in advance with the allowable torque so that a value that is less than the determined value at all times is calculated as the allowable torque for setting the upper limit value. However, when such a method is employed, where the restriction condition is established, even if the rupture torque has a sufficiently high value and a comparatively large value is allowed to be set as the allowable torque, the allowable torque is actually set to a value that is less than the aforementioned lowest rupture torque. Further, because a restriction with respect to the breaking force BF is performed on the basis of this allowable torque, that is, because such a restriction of the braking force BF is performed despite the fact that the protection of the belt 35 is ensured even without the preceding restriction, this restriction can hardly be called desirable from the standpoint of braking requirements of the driver.

In accordance with the invention, with the aforementioned findings in view, a temporary upper limit value XFL1 as the upper limit value corresponding to the allowable torque of the belt 35 and a temporary upper limit value XFL2 as the upper limit value corresponding to the tensile strength (rupture torque) of the belt are compared each time and the smaller value thereof is eventually set as the upper limit value BFL. As a result, the braking force BF can be restricted so that inertia torque inputted to the continuously variable transmission 3 becomes less than both the allowable torque and the rupture torque, without using a mode of calculating a value that is less at all times than the lowest value of the rupture torque determined in advance as a mode of matching the allowable torque. Thus, it is possible both to inhibit accurately the damage of the belt 35 and to inhibit the excessive restriction of the braking force BF.

(6) In the embodiment, the clamping pressure VP of the belt of the continuously variable transmission 3 is increased on the basis of that the restriction condition has been determined to be established. In a case where an excessively large torque has been inputted from the drive wheels 43 to the continuously variable transmission 3, when the belt clamping pressure VP is a comparatively small clamping pressure VP at which a slip of the belt 35 induced by this torque is not supposed to occur, the damage of the belt 35 that accompany the slip of the belt 35 can cause concern. In the embodiment, with the aforementioned findings in view, the clamping force VP of the belt is increased on the basis of that the restriction condition has been established. Therefore, the occurrence of the slip of the belt 35 caused by the input of torque from the drive wheels 43 to the continuously variable transmission 3 can be inhibited more accurately.

The modes for carrying out the invention are not limited to the above-described embodiments and the following modes can be implemented as other modes for carrying out the invention.

In the above-described embodiments, the "belt slip response processing" is executed on the basis of the fulfillment of the restriction condition, but this processing can be omitted. In this case, the allowable torque can be calculated by a map or a computational formula adapted based on the relationship between a speed ratio and a belt clamping pressure, instead of using the map shown in FIG. 5, or the allowable torque can be calculated by a map or a computational formula adapted based on the relationship with either of the speed ratio and the belt clamping pressure.

In the above-described embodiment, a feature of calculating the temporary upper limit value XFL1 and temporary upper limit value XFL2 and eventually setting the smaller of the two values as the upper limit value BFL is used, but the mode of setting the upper limit value BFL is not limited to the above-described mode. For example, the upper limit value BFL calculated based on the allowable torque (in the above-described embodiment, the temporary upper limit value XFL1 corresponds thereto) can be directly set as the upper limit value BFL for restricting the braking force BF.

In the above-described embodiment, when the occurrence of the excessively high load is supposed, the upper limit value BFL of the braking force BF is set, and when the depression amount BP of the brake exceeds the upper limit value BFL, the braking force BF equal to the upper limit value BFL acts. Instead, it is possible to restrict the braking force BF to a value less than the upper limit value BFL.

In this embodiment, the damper device 53 is provided between the foot brake 52 and the brake unit 51 and the relationship between the depression amount BP of the brake 52 and the braking force BF can be changed. Instead, it is possible to omit the damper device and conduct control using a device that can adjust the relationship between the braking force and the depression amount BP of the brake 52, such as a brake assist device.

In the above-described embodiment, the occurrence of the excessively large load is determined on the basis of whether a slip of the drive wheels 43 has occurred and also on the basis of the depression operation mode of the brake 52. However, for example, when the vehicle jumps and the drive wheels 43 are separated from the ground, a state can be assumed in which the brake 52 is abruptly depressed. Even in this case, the effect corresponding to the effect of the above-described embodiment can be demonstrated, provided that the upper limit is set for the braking force of the drive wheels 43.

In the above-described embodiment, the belt 35 is made from a metal, but the invention can be applied and the effect corresponding to that of the embodiment can be demonstrated without any limitation being placed on the belt material, provided that the continuously variable transmission is of a belt type.

In the above-described embodiment, the invention is applied to a vehicle equipped with a belt-type continuously variable transmission. However, the invention can be also applied to a continuously variable transmission other than that of the belt type, for example, to a traction-type continuously variable transmission. Essentially, the invention can be applied to any braking force control apparatus, provided that it is a braking force control apparatus for a vehicle equipped with a continuously variable transmission and including a brake device that brakes a rotation of drive wheels on the basis of a depression amount of a brake.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A braking force control apparatus for a vehicle provided with a brake device that brakes a rotation of a drive wheel of a vehicle equipped with a continuously variable transmission and adjusts a magnitude of a braking force acting upon the drive wheel on the basis of a brake depression amount, comprising:
a controller that is configured to set an upper limit value of the braking force of the brake device when a restriction condition that is a condition, at which an excessively large torque input state occurs, has been estimated to be established, the excessively large torque input state being a state in which a reduced speed of the drive wheel based on the braking force is larger than an allowable limit speed.

2. The braking force control apparatus for a vehicle according to claim 1, wherein
the brake device applies to the drive wheel a braking force of a magnitude corresponding to the depression amount, and when the restriction condition has been determined to be established, the controller sets as the upper limit value a value that is less than the largest braking force applied to the drive wheel corresponding to the depression amount.

3. The braking force control apparatus for a vehicle according to claim 1, wherein
the controller estimates a magnitude of a braking force applied by the brake device to the drive wheel on the basis of the depression amount when the restriction condition has been determined to be established and makes the braking force applied by the brake device to the drive wheel less than the upper limit value on the basis that the estimated braking force is larger than the upper limit value.

4. The braking force control apparatus for a vehicle according to claim 1, wherein
the controller determines whether the restriction condition is established on the basis of a result obtained in determining as to whether a slip of the drive wheel has occurred.

5. The braking force control apparatus for a vehicle according to claim 4, wherein
the controller determines that the restriction condition is established on the basis of determining that a slip of the drive wheel has occurred and determining that a brake depression amount is larger than a reference value.

6. The braking force control apparatus for a vehicle according to claim 4, wherein
the controller determines that the restriction condition is established on the basis of determining that a slip of the drive wheel has occurred and determining that an increase rate of a brake depression amount is larger than a reference rate.

7. The braking force control apparatus for a vehicle according to claim 4, wherein
the controller determines that a slip of the drive wheel has occurred on the basis that a rotation speed of the drive wheel is larger than a reference speed.

8. The braking force control apparatus for a vehicle according to claim 1, wherein
the controller determines whether the restriction condition is established on the basis of a result obtained in determining whether a slip of the drive wheel has occurred and a determination result relating to a brake depression operation mode.

9. The braking force control apparatus for a vehicle according to claim 8, wherein
the controller determines that the restriction condition is established on the basis of determining that a slip of the drive wheel has occurred and determining that a brake depression amount is larger than a reference value.

10. The braking force control apparatus for a vehicle according to claim 8, wherein
the controller determines that the restriction condition is established on the basis of determining that a slip of the drive wheel has occurred and determining that an increase rate of a brake depression amount is larger than a reference rate.

11. The braking force control apparatus for a vehicle according to claim 8, wherein
the controller determines that a slip of the drive wheel has occurred on the basis of that a rotation speed of the drive wheel is larger than a reference speed.

12. The braking force control apparatus for a vehicle according to claim 1, wherein
the vehicle includes a belt-type continuously variable transmission as the continuously variable transmission, and when the restriction condition has been determined to be established, the controller sets the upper limit value on the basis of an allowable torque of a belt of the continuously variable transmission.

13. The braking force control apparatus for a vehicle according to claim 12, wherein
the controller calculates the allowable torque on the basis of a speed ratio of the continuously variable transmission.

14. The braking force control apparatus for a vehicle according to claim 12, wherein
the controller calculates the allowable torque on the basis of a belt clamping force of the continuously variable transmission.

15. The braking force control apparatus for a vehicle according to claim 1, wherein
the vehicle includes a belt-type continuously variable transmission as the continuously variable transmission, and the controller compares a temporary upper limit value XFL1 as the upper limit value corresponding to the allowable torque of the belt of the continuously variable transmission and a temporary upper limit value XFL2 as the upper limit value corresponding to a tensile strength of the belt when the restriction condition has been determined to be established and eventually sets the smaller of the compared values as the upper limit value.

16. The braking force control apparatus for a vehicle according to claim 15, wherein
the controller calculates the allowable torque on the basis of a speed ratio of the continuously variable transmission.

17. The braking force control apparatus for a vehicle according to claim 15, wherein the controller calculates the allowable torque on the basis of a belt clamping pressure of the continuously variable transmission.

18. The braking force control apparatus for a vehicle according to claim 1, wherein
the vehicle includes a belt-type continuously variable transmission as the continuously variable transmission, and the controller increases a clamping force of a belt of the continuously variable transmission on the basis that the restriction condition has been determined to be established.

19. The braking force control apparatus for a vehicle according to claim 1, wherein
when the restriction conditions has been determined to be established, the controller sets the upper limit value before the brake device applies to the drive wheel a braking force of a magnitude corresponding to the depression amount.

20. The braking force control apparatus for a vehicle according to claim 1, wherein
when the restriction condition has been determined to be established, the controller sets the upper limit value to a braking force of the brake device based only on the determination result.

* * * * *